Patented May 14, 1935

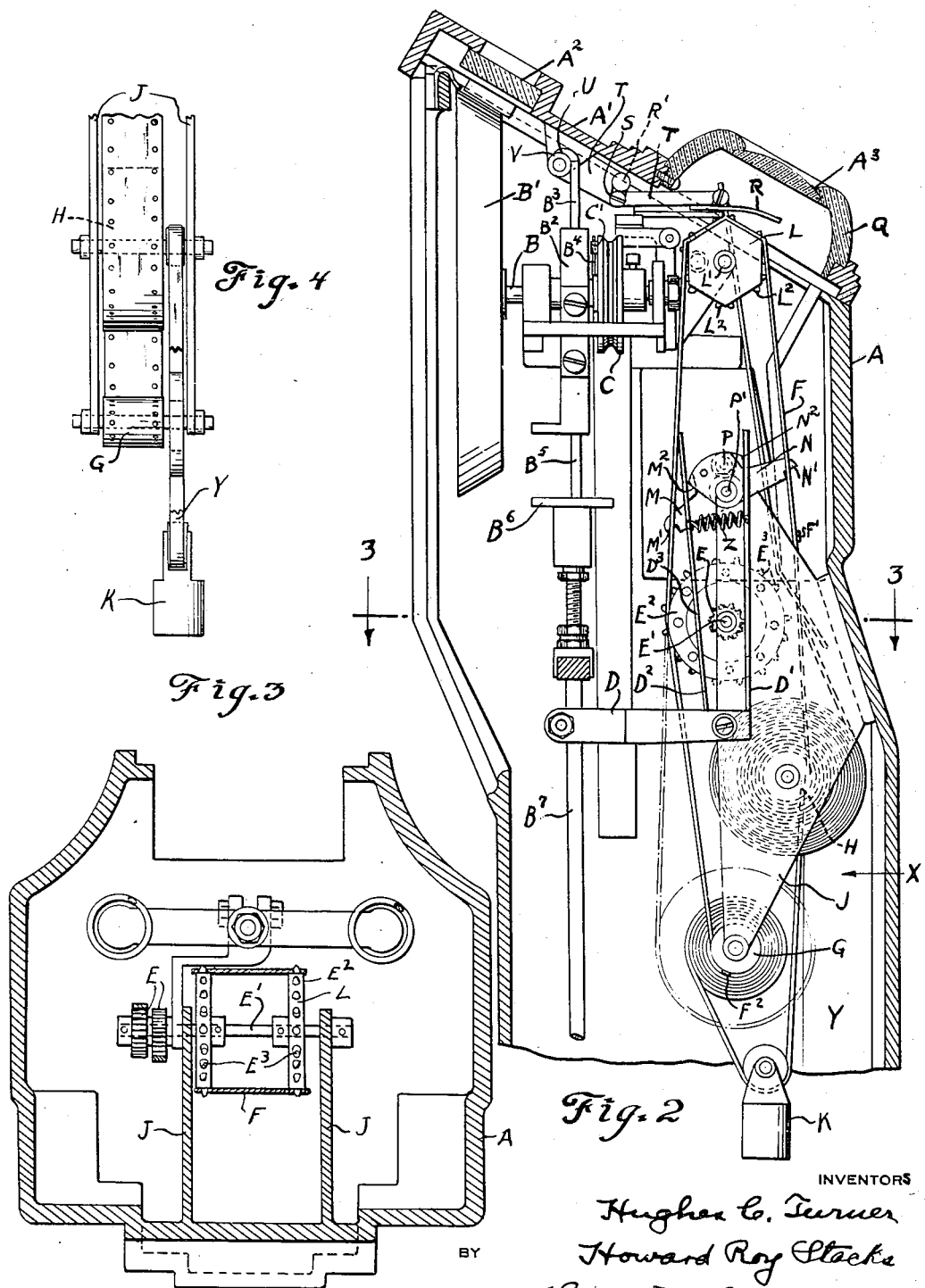

2,001,372

UNITED STATES PATENT OFFICE 2,001,372

DISPLAY APPURTENANCE TO WEIGHING MECHANISM

Hughes C. Turner, New York, N. Y., and Howard Roy Stacks, Detroit, Mich.; said Stacks assignor to said Turner Application October 14, 1933, Serial No. 693,620

4 Claims. (Cl. 40—28)

This invention relates to mechanism adapted to be conjointly used with a now familiar form of weight indicating mechanism for the display of a message through a separate aperture in the enclosing wall or shell from that through which the patron's weight is indicated, generally on the periphery of a rotatable disc which passes relatively close to the weight-observing aperture in the shell. It has for its object an improved organization of parts by means of which, when once the weighing mechanism has been properly released for operation by the depositing of a coin in the slot, the component and related parts may be so actuated as to effect the display of some one of a successive series of messages, such as advertisements, pictures, purported "fortunes" and the like, which are carried on a belt or tape whose regulated travel past the corresponding inspection aperture of the shell is effected by its connection with the load-actuated mechanism.

Unlike the mechanism described and claimed in Letters Patent No. 1,947,814 issued to us February 20, 1934, we have in the form here illustrated constructed and organized our apertures to function with respect to a double wound or terminally anchored belt or tape as contrasted with the endless belt mechanism there shown. For reasons which will be hereafter enlarged upon, and correspondingly therefor, this disclosure has to do with the automatic reversal in the direction of travel of the message bearing belt or tape, and its display in a variant manner accordingly.

In the drawings:

Figure 2 is a side sectional elevational view taken along the line 2—2 of Figure 1 and looking in the direction of the arrows there shown.

Figure 3 is a plan view from above, taken substantially along the line 3—3 of Figure 2 and looking in the direction of the arrows there shown.

Figure 4 is an edge elevational view of the display tape storage rollers taken from a direction indicated by the arrow X in Figure 2.

Figure 1:
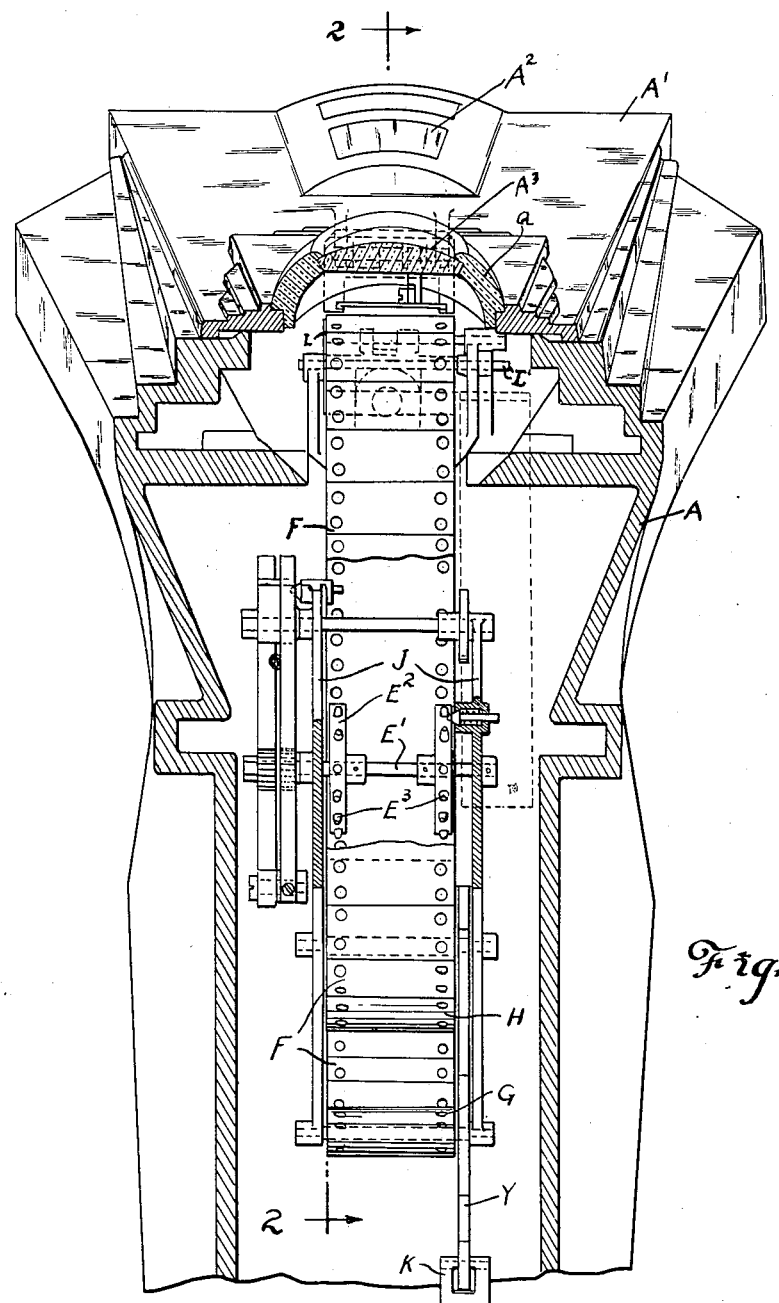
Figure 1 is a front elevational view of our combined weighing and message offering apparatus, with the front wall of the shell broken away so as to show the positioning and functioning of the message bearing tape relatively to the other parts.

A indicates a shell of suitable and now well known contour having a sloping top portion A' provided with lens-filled inspection apertures $A^2$ and $A^3$. Supported upon the rotatably journaled shaft B is a weight-indicating disc B' whose periphery passes closely adjacent the lens aperture $A^2$. At C is located a balance wheel secured to the shaft B, the spindle being provided with a driving pin C'. The shaft B also carries loosely mounted thereon a gear pinion $B^2$, driven by a rack $B^3$, the pinion carrying a driving pin $B^4$ which operatively engages the driving pin C'. Operatively the rack $B^3$ is a part of the lever rod $B^5$ and bears on the breaking plate $B^6$ which is connected by the steelyard $B^7$ with the load platform (not shown). For the sake of simplicity we have also abstained from showing any coin-trip means for releasing these weighing parts for weight-actuation, since any one of several forms could be used, and as such forms no part of our present invention.

Projecting laterally from the steelyard $B^7$ is a bracket D, carrying near its end a pair of upstanding and somewhat resilient rods D' and $D^2$, each provided with ratchet driving toothing on their opposing faces. Dependent upon the operation of the throw-off mechanism, which will be hereinafter described, one or the other of these ratcheted rods is in operative engagement with the gear E, mounted upon the shaft E', which shaft also carries the much larger drum gear $E^2$, which at each end of its periphery is provided with a series of spaced pins as $E^3$, which, similarly to the operation of a motion picture film, are adapted to engage in corresponding holes in the margin of a tape or display strip F. The ends of this display strip F are carried by and wound upon the drums G and H, the shafts of which are preferably journaled at their ends in the supporting bracket J. For purposes of maintaining an adequately tight draw upon the tape as it is being operated the ends of a narrower tape are wound upon the shafts of the drums G and H, and its mid portion depends in a loop therefrom, being weightedly drawn down to the desired degree of tension by the weight-laden pulley K.

Such portion of the display tape F as is not at any given time wound upon the drums G and H passes upwardly therefrom and over the hexagonal or similarly angular display drum L, whose shaft L' is rotatably journaled at its ends in a suitable bracket or in the side walls of the shell A. It will be noted that this display drum is positioned in the direct focal line of the lens $A^3$, and that its sides instead of offering a curved surface over which the tape F is drawn, involve the flat positioning of the tape over the successive ones of its straight sides. This hexagonal drum being also provided with similarly spaced pins L² to those present on the periphery of the studded drum E, it will be obvious that if the shaft E' of this latter is rotated, due to the downward draw upon it of one or the other of the ratcheted rods D' or D², the tape will be movingly actuated about the hexagonal drum L the exact distance required to change from one display on the tape F to another, it being of course understood that the size of these several displays is made to correspond therewith.

To provide for the proper reversal in the direction of travel of the tape F when one or the other of its normally wound drum ends M is approached, we provide stops as F' and F² on the tape F so near the normally drum-carried ends thereof that the distance from the level of the overthrow members M and N to the tape-carrying drums G and H respectively will approximately measure a total of the available length of tape not already drawn in the then prevailing direction by and past the studded actuating drum E. These overthrow members M and N, it will be noted, are carried in a position of limited rotation relatively to the supporting shaft P, whose ends are suitably suported in the bracket J. Each of these reversing members projects on each side of the supporting shafts P and P' and is notched at one end, as M' and N' respectively, for engagement by their respective stops F' and F² on the tape F. The other ends of these tripping members are of the cam form shown elevationally in Figure 2 at M² and N² respectively, being so contoured that so long as their respective notched ends remain unengaged by the stops or the belt F they will leave their respective gear tooth-supporting rods D' and D² in engagement with the ratchet wheel E on the shaft E'. In Figure 2, for example, the toothed rod D' is shown as in engagement with the ratchet wheel, while the corresponding toothed rod D² has been thrown out of engagement therewith by the tripping of the overthrow member M, so that its cam portion M² has bent the rod D² slightly to the left. Similarly, the overthrow piece N, provided with a similarly contoured cam piece N² is adapted to be actuated to the position shown in dotted lines by the engagement against its notched ends of the trip projection F² on the left hand stretch of the tape F; thus no matter how continuously the weight-indicating mechanism is actuated, resulting in the operation of the tape-display mechanism just described, the tape is sure of actuation about the hexagonal drum L in one direction or the other, and if the tape F be made of sufficient length to carry an appreciable number of separate messages or displays, a corresponding number of actuations of the entire mechanism will have to be gone through with before the patron encounters a repetition of the displayed message or "fortune" on the then exposed sloping though straight surface of the hexagonal drum L which lies in the direct range of observability through the lens A³.

In some cases the truncated sphere Q in whose apertured center portion the message-observing lens is located may be made wholly of glass. In such cases as involve the curved sides of this spherical support being made of frosted glass, it would of course be impossible to view the displayed message on the sloping hexagonal side of the drum L at an angle, and a would-be cheater of the mechanism would thus be precluded from reading the message without paying for the amusement involved therein. Even transparent glass might be used for the bowl Q, since its focus would preclude reading the tape therethrough. If, however, these side walls be made opaque, it would still be possible for a would-be cheater to read the message directly through the lens. To preclude this we provide the pivoted shutter R, which is mounted upon the shaft S, and whose bell crank projection R' is connected with one end of the link T, the other end of which is similarly pivotally connected with the end of the bell-crank projection U whose throw is determined by and attendant upon the authorized load-actuated operation of the weighing mechanism, due to its detention or release when the downward travel of the rack permits the over-weighted cam V to fall, thus actuating the bell crank lever R' and its connected link U accordingly.

What we claim is:

1. In combination with a load-operable mechanism, means for effecting the successive display of a variety of prepared messages synchronously with the operation thereof, comprising a pair of storage drums, a message-bearing strip adapted to be unwound from one of said drums as it is rolled upon the other of said drums, a display drum over which the intermediate portion of said strip passes on its way from one to the other of said drums, said display drum being positioned observedly adjacent a selected point relatively to the probable location of the user's eye, means actuated by the movement of the load-operable mechanism whereby the movement of the strip through a predetermined distance along its length is contemporaneously effected, and means rendered active by the engagement thereagainst of selectively located projecting appurtenances upon the strip whereby a reversal in the direction of movement of the latter is automatically effected.

2. The combination, with a load operable mechanism and with means for correspondingly indicating the degree thereof, of a display strip bearing a plurality of individual displays, a pair of drums on and between which said display strip is carried, means for effecting the limited travel of said strip from one drum to the other according to the actuation of said load-operable mechanism, a display drum over which the intermediate portion of said strip passes for successive display of its individual surface portions, and means operable by the engagement thereagainst of selected portions of said strip whereby the direction of travel thereof is automatically reversed.

3. A combined weight-indicating and message displaying mechanism, comprising, in combination with load-responsive elements adapted to indicate the degree of response to an imposed load, means operatively connected therewith whereby each actuation of said load-responsive elements is transmitted elsewhere in equal degree regardless of variances in the applied load imposed upon the former, a gear drum adapted to receive its operative actuation from said last-named element, a pair of rotatable storage and delivery drums, a message bearing strip carried by and between said drums, said strip being operatively engaged by said gear drum for the effectuation of its movement through a predetermined distance at each operation of said transmitting means with which the load responsive elements are connected, an idler drum over whose peripheral surface the intermediate portion of said strip is drawn for display of successive sections thereof at a predetermined observation point, and normally inactive means adapted to be activated by the engagement thereagainst of certain portions of said display strip whereby the direction of actuated movement of the latter is reversed.

4. In combination with a display strip, a pair of drums upon and between which said display strip is supported, a rotatable display drum over whose periphery said display strip is observably drawn, means for effecting the intermittent travel of said strip over said display drum and from one to the other of said storage drums through a predetermined portion of its length, means operatively connected with an external load-responsive element whereby said strip-advancing means is successively actuated each time to the same degree and regardless of variances in the loads to which said external element may be successively subjected, and means rendered operable by the engagement thereagainst of selected points on said strip whereby the direction of travel of the latter is automatically reversed.

HUGHES C. TURNER.
HOWARD ROY STACKS.